United States Patent
Murata et al.

(10) Patent No.: US 9,738,020 B2
(45) Date of Patent: Aug. 22, 2017

(54) MOLD CLAMPING MECHANISM

(71) Applicant: NISSEI PLASTIC INDUSTRIAL CO., LTD., Hanishina-gun, Nagano (JP)

(72) Inventors: Atsushi Murata, Nagano (JP); Kimiaki Shioiri, Nagano (JP); Tatsuhiko Nishizawa, Nagano (JP); Isamu Yamaguchi, Nagano (JP); Kazunori Tanaka, Nagano (JP)

(73) Assignee: NISSEI PLASTIC INDUSTRIAL CO., LTD. (JP)

( * ) Notice: Subject to any disclaimer, the term of this patent is extended or adjusted under 35 U.S.C. 154(b) by 8 days.

(21) Appl. No.: 14/816,956

(22) Filed: Aug. 3, 2015

(65) Prior Publication Data

US 2016/0031138 A1     Feb. 4, 2016

(30) Foreign Application Priority Data

Aug. 4, 2014 (JP) ................................. 2014-158953
Jul. 3, 2015 (JP) ................................. 2015-134491

(51) Int. Cl.
    *B29C 45/64*     (2006.01)
    *B29C 45/17*     (2006.01)

(52) U.S. Cl.
    CPC ................................ *B29C 45/1744* (2013.01)

(58) Field of Classification Search
    CPC ................................................. B29C 45/1744
    USPC ................. 425/450.1, 451, 451.2, 451.9, 406
    See application file for complete search history.

(56) References Cited

U.S. PATENT DOCUMENTS

| | | | | |
|---|---|---|---|---|
| 5,776,402 A | * | 7/1998 | Glaesener | B29C 45/1744 425/450.1 |
| 6,027,329 A | * | 2/2000 | Nazarian | B29C 45/1744 425/451 |
| RE39,193 E | * | 7/2006 | Glaesener | B29C 45/1744 425/451.9 |
| 7,318,721 B2 | * | 1/2008 | Spicer | B29C 45/1744 425/472 |
| 7,491,051 B2 | * | 2/2009 | Matsushita | B29C 45/1744 425/595 |
| 9,314,950 B2 | * | 4/2016 | Senga | B29C 45/1744 |
| 9,339,958 B2 | * | 5/2016 | Nishimura | B29C 45/1744 |

FOREIGN PATENT DOCUMENTS

JP         2587035         10/1998

* cited by examiner

*Primary Examiner* — Joseph S Del Sole
*Assistant Examiner* — Thukhanh T Nguyen
(74) *Attorney, Agent, or Firm* — Adams & Wilks

(57) ABSTRACT

A mold clamping mechanism includes a fixed platen and a movable platen. The fixed platen includes upper and lower, left and right through-holes through which extend tie-bars, and a cutout that extends transversely through the through-holes and divides the through-holes into mold-side holes and opposite-mold-side holes. The fixed platen is divided by the cutout into a mold-side part and an opposite-mold-side part. The mold-side part is provided with main leg parts connected to the bed.

10 Claims, 9 Drawing Sheets

MOLD CLAMPING MECHANISM

FIELD OF THE INVENTION

The present invention relates to an improvement in a mold clamping mechanism that forms an injection molding apparatus.

BACKGROUND OF THE INVENTION

Generally, an injection molding apparatus is comprised of a bed and a mold clamping mechanism placed on the bed. Mold clamping is performed by the mold clamping mechanism. A resin material is injected into a mold from an injection machine to thereby provide a molded article. Mold clamping mechanisms employing various devices are known (see, e.g., Japanese Utility Model Registration No. 2587035, hereinafter referred to as Patent Literature 1).

The mold clamping mechanism disclosed in Patent Literature 1 will be described below with reference to FIG. 10 hereof.

As shown in FIG. 10, the mold clamping mechanism 100 wherein a fixed platen 102 and a pressure receiving platen 103 are secured to a bed 101, tie-bars 104, 104 are disposed to extend between the two platens, a movable platen 105 is mounted to the tie-bars 104, 104, and the movable platen 105 is moved by means of a mold clamping cylinder 106 provided to the pressure receiving platen 103.

The mold clamping mechanism disclosed in the registration is featured in the fixed platen 102 having a cutout 107. In Patent Literature 1, the fixed platen 102 is described as receiving a reaction force and elastically deforming, as shown by a phantom line A, upon mold clamping. However, the present inventors have perceived a contradiction present in the description.

Such a contradiction will be described with reference to FIG. 11 hereof. The fixed platen 102 is firmly secured to the bed 101 by a leg part 108. A vicinity of the leg part 108 has higher rigidity than other parts. As a result, a part shown by a phantom line B deforms only slightly while a part shown by a phantom line C and being remote from the let part 108 deforms largely. A maximum deformation point 109 resides at the center of the phantom line C and is deviated upward from the center of a nozzle 111 of an injection machine. As a result, attachment of the nozzle 111 of the injection machine to the mold becomes unstable whereby disadvantages such as an occurrence of resin leakage, failure in uniform transmission of a mold clamping force, mold deformation and production of defective products are experienced.

For achieving appropriate or stable attachment of the nozzle 111, uniform deformation as shown by a phantom line A is required. However, the leg part should not be omitted.

Consequently, there is a demand for an improvement in the construction of the fixed platen such that while having the leg part connected to the bed, the fixed platen exhibits uniform deformation and does not impart adverse effects of the deformation to the mold and resulting products.

SUMMARY OF THE INVENTION

It is an object of the present invention to provide a mold clamping mechanism with a fixed platen which, while having a leg part to be connected to a bed, deforms uniformly and wherein the deformation does not adversely affects an associated mold and resulting molded products.

According to the present invention, there is provided a mold clamping mechanism which comprises: a bed; a fixed platen secured to the bed; a pressure receiving platen secured to the bed; upper and lower, left and right tie-bars extending between the fixed platen and the pressure receiving platen; and a movable platen mounted to the tie-bars, the movable platen and the fixed platen capable of being operated to effect clamping of a mold, wherein the fixed platen includes upper and lower, left and right through-holes for allowing passage of the tie-bars therethrough, and a cutout for separating the through-holes into mold-side holes and opposite-mold-side holes, the fixed platen is divided by the cutout into a mold-side part and an opposite-mold-side part, and the mold-side part is provided with main leg part connected to the bed.

In the invention as arranged above, the fixed platen has the mold-side part and the opposite-mold-side part separated by the cutout. The mold-side part is secured to the bed by means of the main leg part. During mold clamping, the upper and lower, right and left tie-bars are pulled, whereby the opposite-mold-side part deforms uniformly. However, since the mold-side part is separated from the opposite-mold-side part by the cutout, deformation becomes small with the result that the associated force is transmitted uniformly to the mold so that the deformation of the mold and the generation of mal-molding are suppressed.

Preferably, the mold-side hole has a diameter larger than that of the opposite-mold-side hole. Even when the mold-side part deformed largely, it may not contact the tie-bars.

Desirably, the opposite-mold-side part is provided with a sub-leg part connected to the bed, the sub-leg part being provided within the left and right through-holes. The sub-leg part is disposed at a position freed from the deformation. This enables fixing of the opposite-mold-side part as well to the bed.

It is preferred that the sub-leg part have an extension extending toward the injecting machine beyond the opposite-mold-side surface of the opposite-mold-side part. As a result, downfall of the fixed platen can be suppressed.

Preferably, the mechanism further comprises a connection part connecting the mold-side part and the opposite-mold-side part. The connection part may be comprised of a center part surrounding a sprue; an upward protrusion protruding upward from the center part; a leftward protrusion protruding leftward from the center part; a rightward protrusion protruding rightward from the center part; and a downward protrusion protruding downward from the center part. With is arrangement, it becomes possible to reduce the weight of the fixed platen while maintaining the required rigidity at the connection part.

Desirably, the downward protrusion comprises at least two strap-shaped protruding parts spaced from each other in a left-and-right direction.

It is preferred that the upward protrusion be T-shaped and have an orthogonal part extending along an upper side of the mold-side part, that the leftward protrusion be T-shaped and have an orthogonal part extending along a left side of the mold-side part, and that the rightward protrusion be T-shaped and have an orthogonal part extending along a right side of the mold-side part.

The opposite-mold-side part may be connected to the left and right main leg parts through the left and right connection parts.

BRIEF DESCRIPTION OF THE ACCOMPANYING DRAWINGS

DETAILED DESCRIPTION OF THE PREFERRED EMBODIMENTS

Preferred embodiments of the present invention will now be described with reference to the accompanying drawings.

Figure 1:
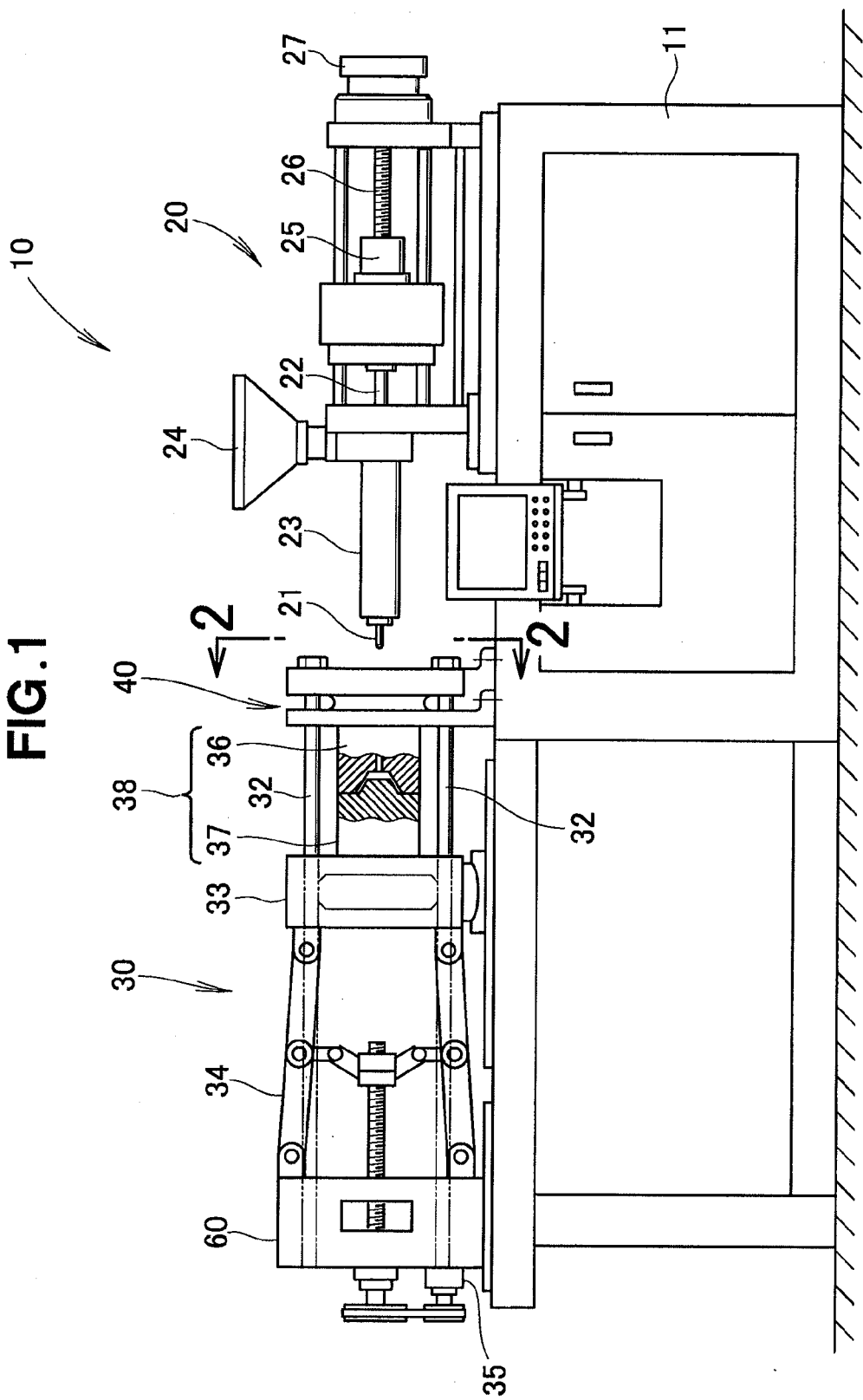
FIG. 1 is a view illustrating in front elevation an injection molding apparatus employing a mold clamping mechanism according to the present invention.

As shown in FIG. 1, an injection molding apparatus 10 is comprised of a bed 11, an injection machine disposed on the bed 11, and a mold clamping mechanism 30.

The injection machine 20 includes a heating cylinder 23 having at its top end a nozzle 21 and a built-in screw, a hopper 24 for supplying a resin material into the heating cylinder 23, a nut 25 connected to a proximal part of the screw 22, a threaded shaft 26 threadedly engaged with the nut 25, and a turning member 27 for turning the threaded shaft 26, and is configured to inject the resin material out from the nozzle 21.

The mold clamping mechanism 30 includes a fixed or stationary platen 40 fixed to the bed 11, a pressure receiving platen 60 disposed on the bed 11, tie-bars 32, 32 extending between the pressure receiving platen 60 and a fixed or stationary platen 40, a movable platen 33 movably mounted to the tie-bars 32, 32, a toggle link 34 extending, for moving the movable platen 33, between the movable platen 33 and the pressure receiving platen 60, and a toggle driver 35 for driving the toggle link 34.

A fixed die 36 is mounted to the fixed platen 40 while a movable die 37 is mounted to the movable platen 33. A mold 38, formed by the fixed die 36 and the movable die 37, is closed and opened by the mold clamping mechanism 30.

Of the fixed platen 40, a part which is proximate to the mold 38 is hereinafter called "mold-side" (first side) while another part which is remote from the mold 38 is hereinafter called "opposite-mold-side" (second side).

Figure 2:
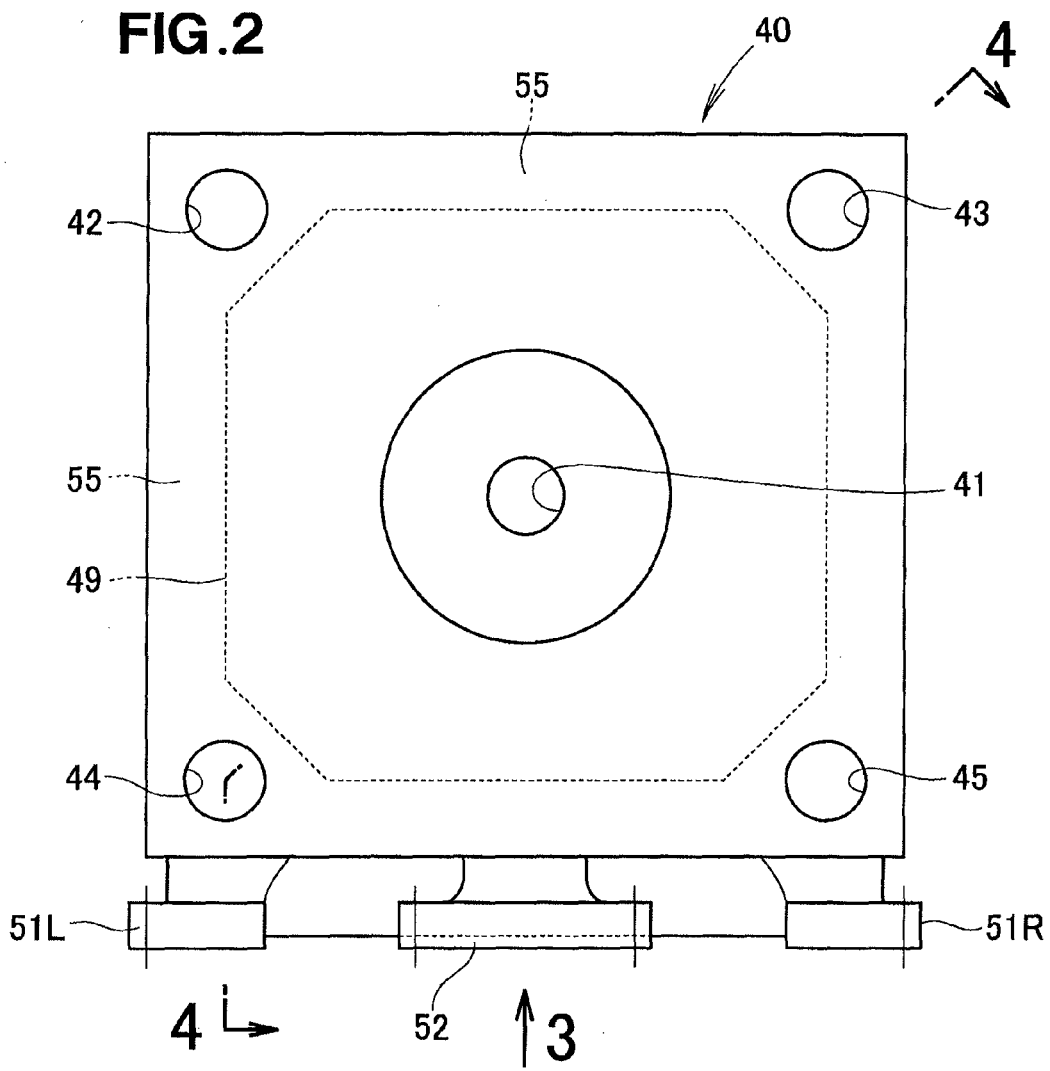
FIG. 2 is a view of the injection molding apparatus as seen in the direction of arrow 2 of FIG. 1.

As shown in FIG. 2, the fixed platen 40 is in the form of a generally rectangle and has a sprue 41 at a center thereof and a through-hole at each of four corners thereof, namely, a left upper through-hole 42, a right upper through-hole 43, a left lower through-hole 44 and a right lower through-hole 45.

Figure 3:
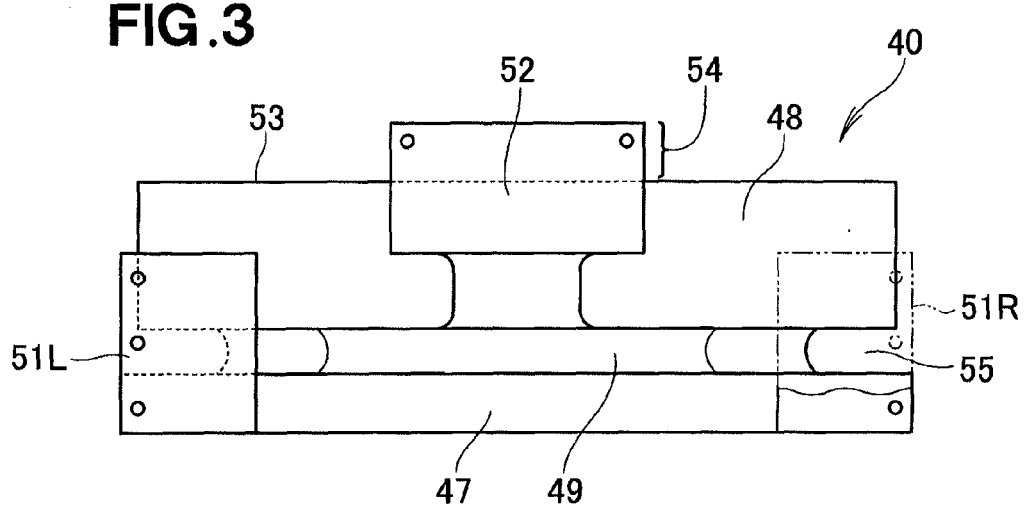
FIG. 3 is a view of a fixed platen as seen in the direction of arrow 4 of FIG. 2.

As shown in FIG. 3, the fixed platen 40 includes a mold-side part 47, an opposite-mold-side part 48 and a constricted connection part 49. The mold-side part 47 has left and right main leg parts 51L, 51R formed integrally. The opposite-mold-side part 48 includes a sub-leg part 52 provided centrally thereof. The sub-leg part 52 has an extension 54 extending beyond an opposite-mold-side surface 53 of the opposite-mold-side part 48 toward the injection machine 20.

Figure 4:
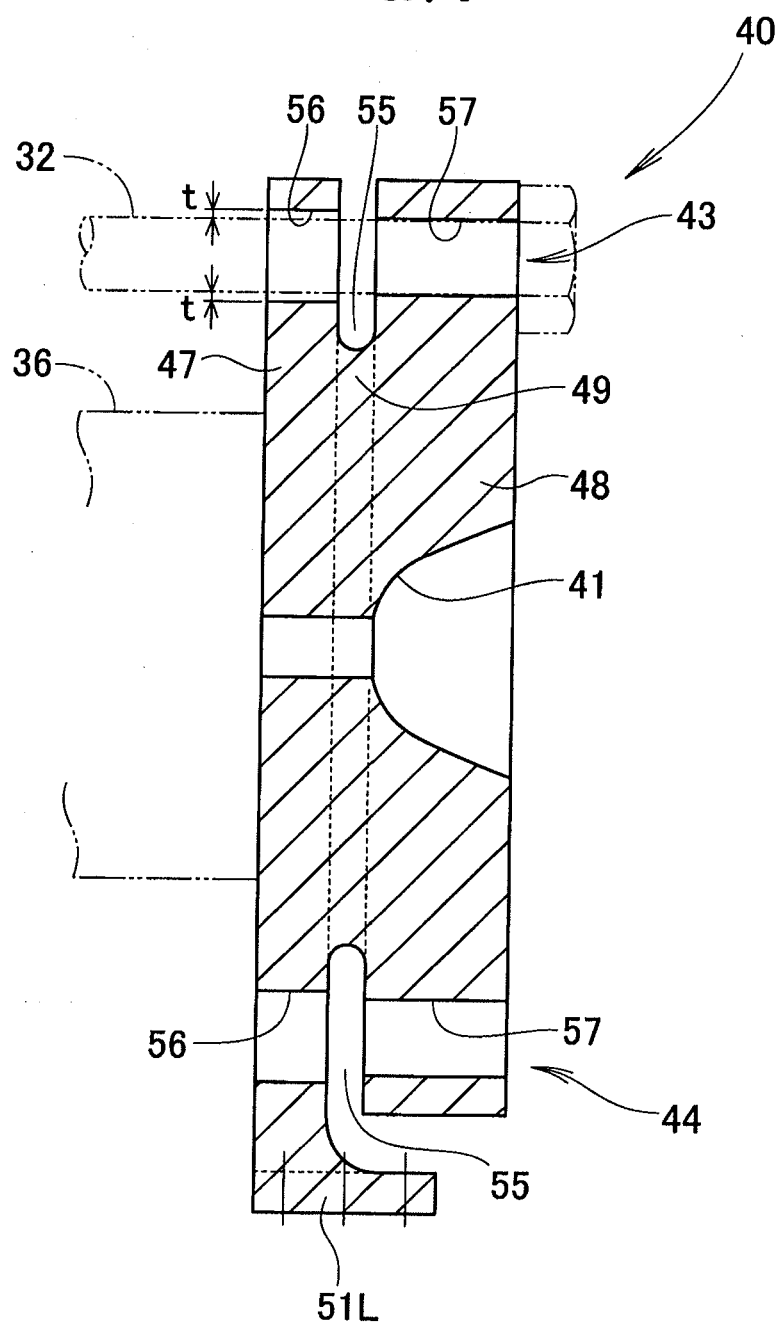
FIG. 4 is a cross-sectional view taken along line 4-4 of FIG. 2.

As shown in FIG. 4, the fixed platen 40 has opposed major surfaces (left and right surfaces in FIG. 4) bounded by a side surface, and the left lower through-hole 44 is separated by a circumferential-groove-shaped cutout 55, which is formed in the side surface, into a mold-side hole 56 and an opposite-mold-side hole 57. The right upper through-hole 43 is also separated by the cutout 55 into the mold-side hole 56 and the opposite-mold-side hole 57. The left upper through-hole 42 and the right lower through-hole 45 shown in FIG. 2 are also constructed similarly. Stated otherwise, the circumferential cutout 55 extends transversely through the through-holes 42-45 and divides the through-holes into mold-side holes and opposite-mold-side holes. The connection part 49 has an octagonal cross-section surrounded by the cutout 55, as shown by a dashed line.

The opposite-mold-side hole 57 is set to have a size corresponding to an outside diameter of the tie-bar 32 shown by a phantom line in FIG. 4. In contrast, the mold-side hole 56 is set to have a size larger than the outside diameter of the tie-bar 32 so as to leave a gap of t (10-20 mm) with respect to the tie-bar 32. Consequently, even when the tie-bar 32 is inclined, the tie-bar 32 will not contact a mold-side part 47. The main leg part 51L is provided to the mold-side part 47.

An operation of the thus-configured fixed platen 40 will now be described.

Figure 5:
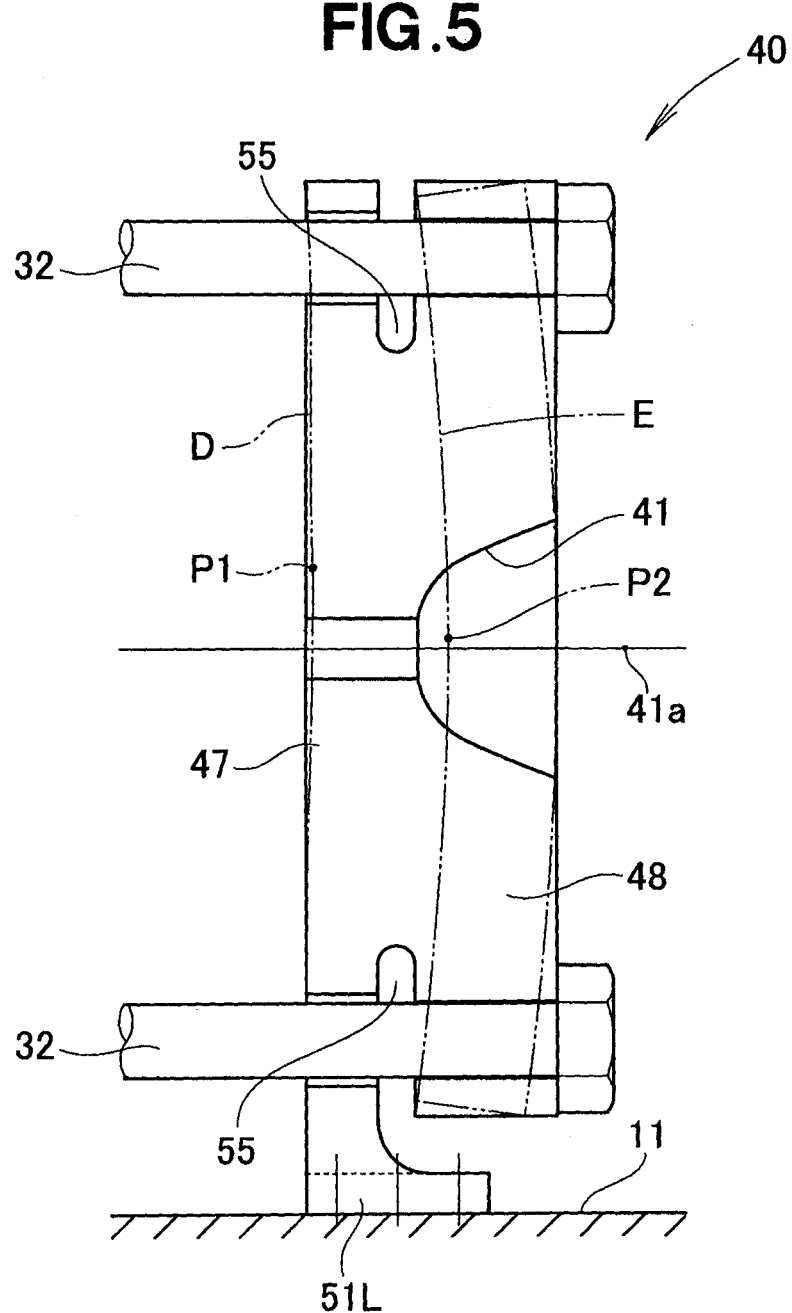
FIG. 5 is a view illustrating the state of distortion of the fixed platen.

As shown in FIG. 5, when mold clamping is carried out, the tie-bars 32, 32 are pulled and stretched with the result that the injection-side part 48 deforms generally vertically uniformly such that the position of a maximum deformation point P2 coincides with a generally center 41a of the sprue 41. This enables a satisfactory nozzle attachment.

On the other hand, because the influence of the deformation of the opposite-mold-side part 48 is relaxed by the cutout 55, the degree of deformation of the mold-side part 47 becomes small, as shown by phantom line D compared to phantom line E. In particular, the vicinity of the main leg part 51L, having high rigidity, hardly ever deforms. As a result, deformation of the mold is suppressed and generation of defects in molded products can be prevented.

Note that the sub-leg part 52 shown in FIG. 2 may be omitted. However, when there is a concern over downfall of the fixed platen 40, the sub-leg part 52 may be provided so that the phantom line E can be maintained. Namely, as shown in FIG. 5, the opposite-mold-side part 48 receives on large magnitude a tension of the tie-bars 32, 32. The deformation shown by the phantom line E includes the components of the tension of the tie-bars 32, 32.

If the sub-leg part 52 is provided to the vicinity of the left lower through-hole 44 or the vicinity of the right lower through-hole 45, as shown in FIG. 2, there will appear in FIG. 5 a large discrepancy between the deformation by the upper tie-bar 32 and the deformation by the lower tie-bar 32. This is because the lower one exhibits smaller deformation. As a result, the phantom line D may not be obtained.

To this end, in the present invention, the sub-leg part 52 is provided to an intermediate position between the left lower through-hole 44 and the right lower through-hole 45, which is remotest from the left lower through-hole 44 and the right lower through-hole 45, as shown in FIG. 2, whereby the phantom line E can be obtained. Provision of the extension 54, as shown in FIG. 3, causes the sub-leg part 52 to protrude largely whereby the fixed platen 40 freed from downfall is provided.

Next, description will be made as to a modification of the fixed platen with reference to FIGS. 6 through 9.

Figure 6:
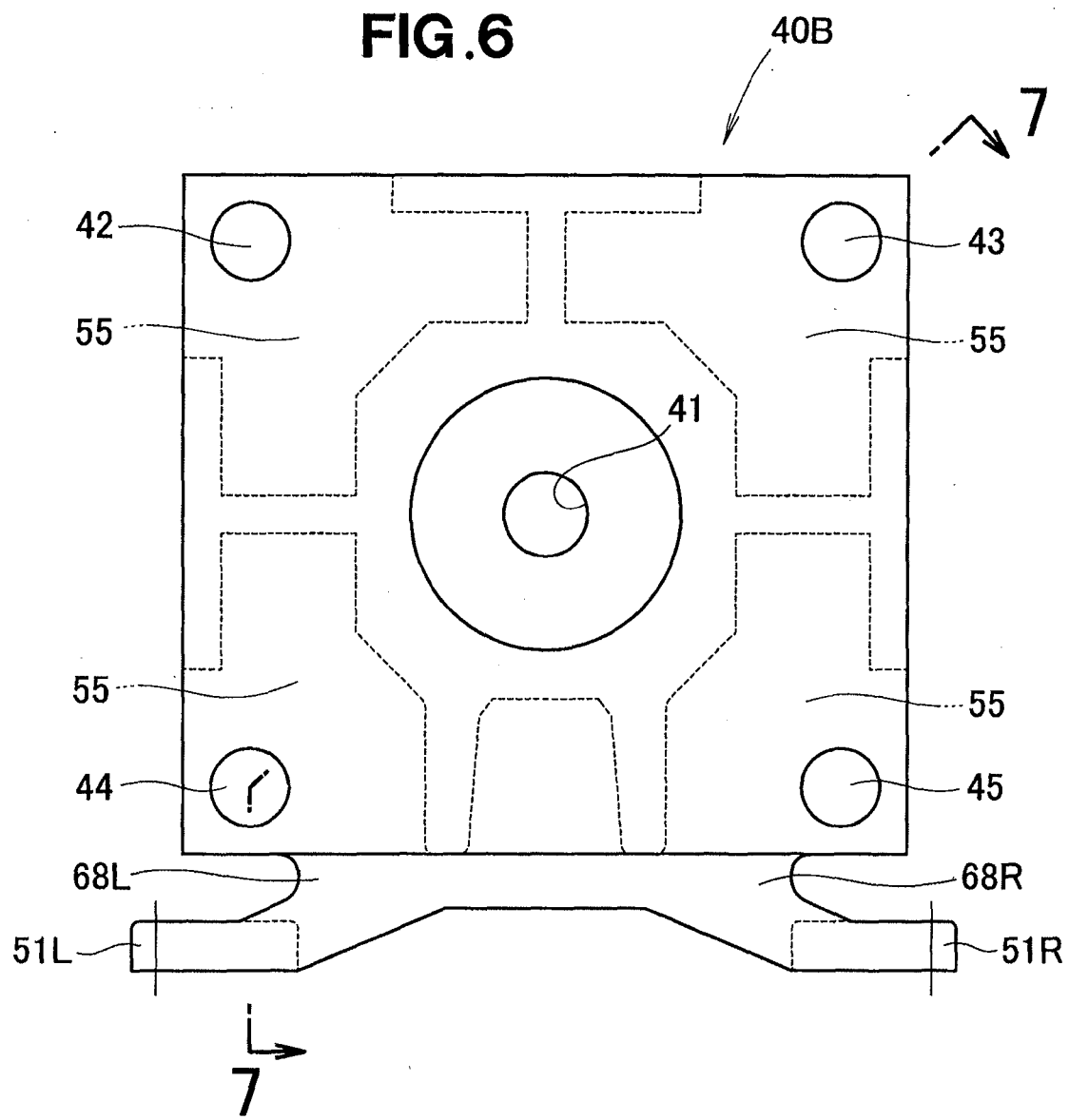
FIG. 6 is a view illustrating an example alteration of the fixed platen.

As shown in FIG. 6, the fixed platen 40B takes the form of a generally rectangle and has a left upper through-hole 42, a right upper through-hole 43, a left lower through-hole 44 and a right lower through-hole 45 at four corners thereof.

Figure 7:
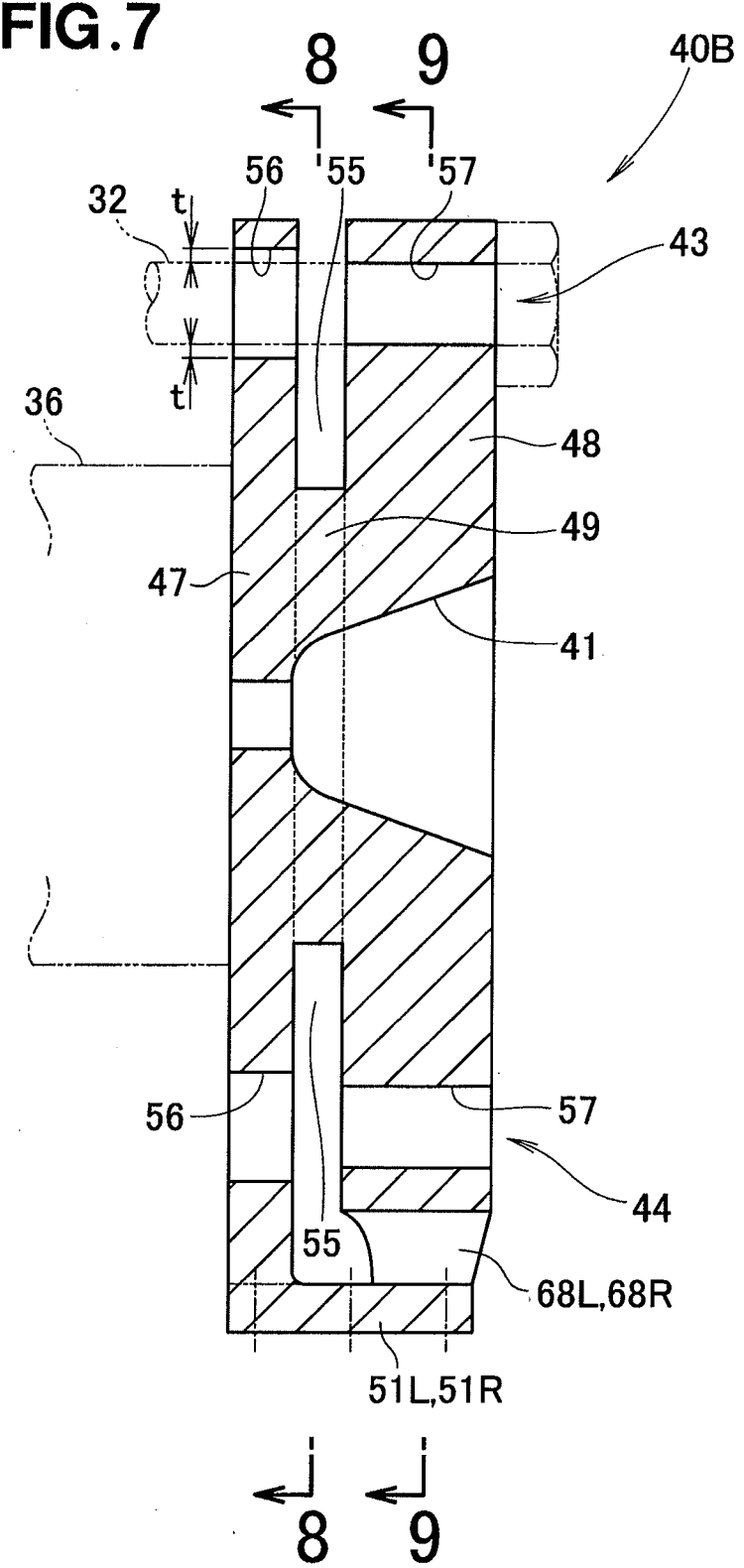
FIG. 7 is a cross-sectional view taken along line 7-7 of FIG. 6.

Turning now to FIG. 7, the left lower through-hole 44 is separated, by the cutout 55 in the form of a circumferential groove, into the mold-side hole 56 and the opposite-mold-side hole 57. Similarly, the right upper through-hole 43 is separated into the mold-side hole 56 and the opposite-mold-side hole 57 by the cutout 55. The left upper through-hole 42 and the right lower through-hole 45 shown in FIG. 7 are also configured similarly. The connection part 49 is surrounded by the cutout 55 into a cross shape as shown by a dashed line.

As shown in FIG. 7, the opposite-mold-side hole 57 is set to have a size corresponding to an outside diameter of the tie-bar 32, as shown by a phantom line. On the other hand, the mold-side hole 56 is set to be larger than the outside diameter of the tie-bar 32 so as to leave a gap of t (10-20 mm) relative to the tie-bar 32. Consequently, when the tie-bar 32 is inclined unexpectedly, it will not contact the mold-side part 47. The main leg part 51L is provided to the mold-side part 47.

Discussion will be made next as to the details of the construction of the connection part 49 with reference to FIG. 8 which is a cross-sectional view taken along line 8-8 of FIG. 7.

Figure 8:
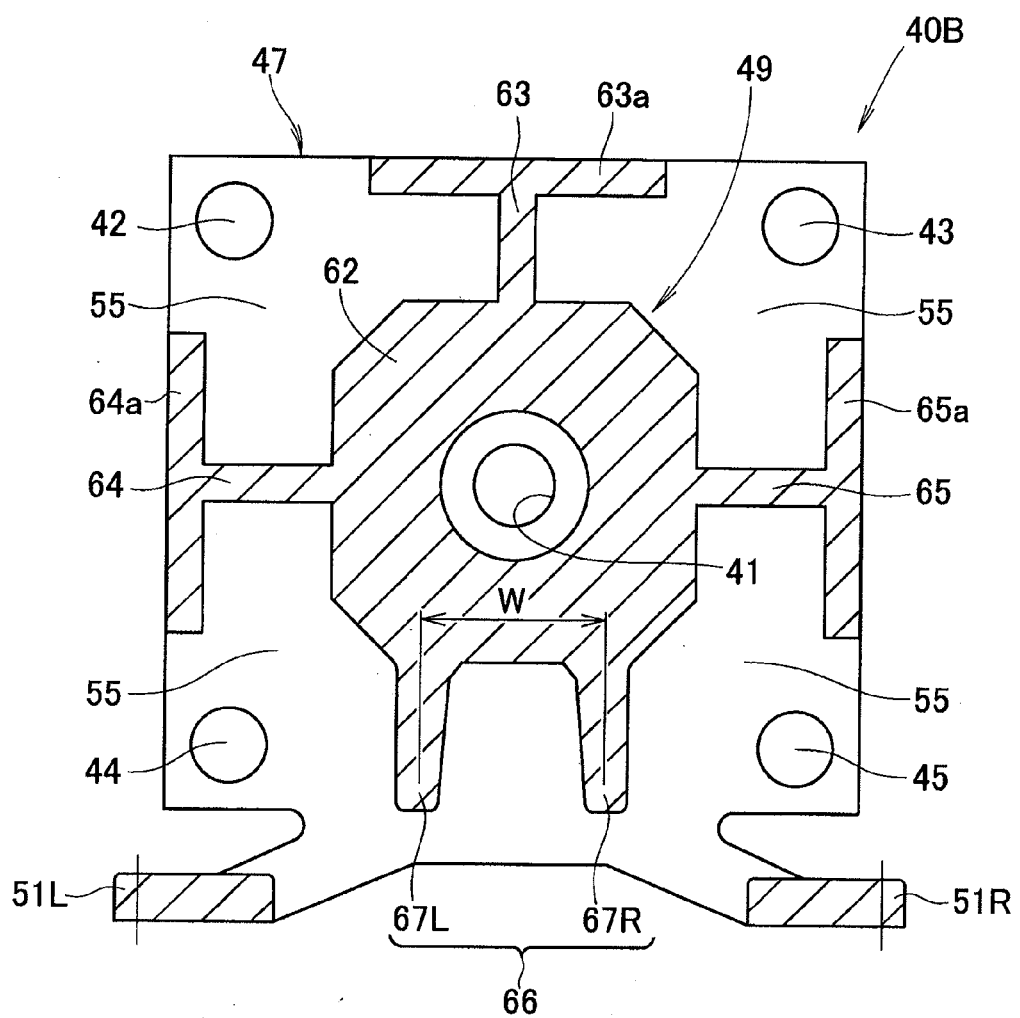
FIG. 8 is a cross-sectional view taken along line 8-8 of FIG. 7.

As shown in FIG. 8, the connection part 49 includes a center part 62 of octagonal shape surrounding the sprue 41, an upward protrusion 63 protruding upward from the center part 62, a rightward protrusion 65 protruding rightward from the center part 62, and a downward protrusion 66 protruding downward from the center part 62. With this arrangement, it is possible to provide the cutout 55 which is large enough for the through-hole 42 in the vicinity of the latter. Other through-holes 43-45 are also provided with such large-enough cutouts 55 in their vicinities.

Consequently, as described with reference to FIG. 5, owing to the cutout 55, deformation of the mold-side part 47 is minimized because the influence of the deformation of the opposite-mold-side part 48 is minimized or relaxed, whereby production of defective molded products can be kept to a minimum.

In FIG. 8, the downward protrusion 66 is formed of two strap-shaped protruding parts 67L, 67R spaced a distance W from each other in a left-and-right direction. Leaving the distance W between the two protruding parts contributes to weight reduction of the platen while enabling maintenance of desired connection rigidity. Alternatively, the downward protrusion 66 may formed of three or more strap-shaped protruding parts.

The upward protrusion 63 is T-shaped and has at its top end an orthogonal part 63a extending along an upper side of the mold-side part 47 while the leftward protrusion 64 is T-shaped and has at its top end an orthogonal part 64a extending along a left side of the mold-side part 47. Similarly, the rightward protrusion 65 may be T-shaped and has at its top end an orthogonal part 65a extending along a right side of the mold-side part 47. With this arrangement, it becomes possible to reduce the weight of the fixed platen 60B while maintaining the required connection rigidity. The left and right protrusions 64, 65 are also constructed similarly.

Figure 9:
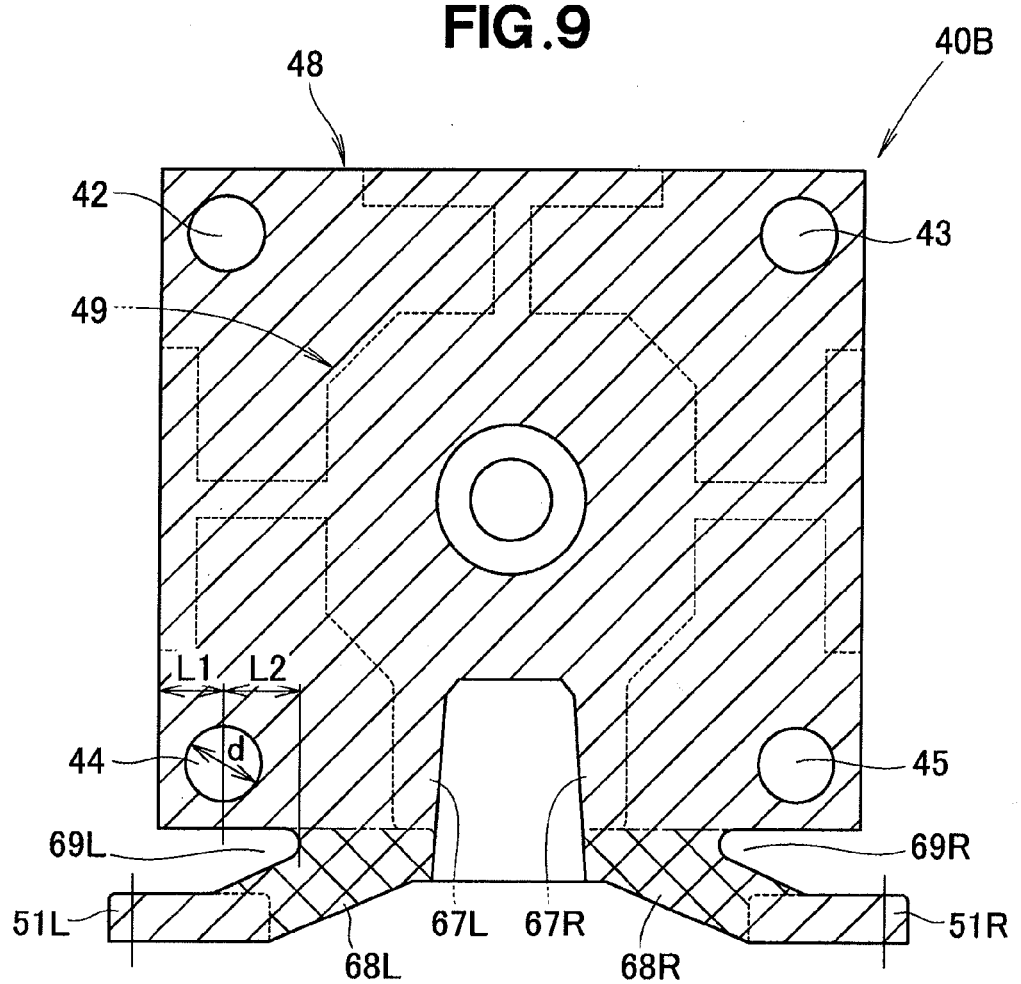
FIG. 9 is a cross-sectional view taken along line 9-9 of FIG. 7
Figure 10:
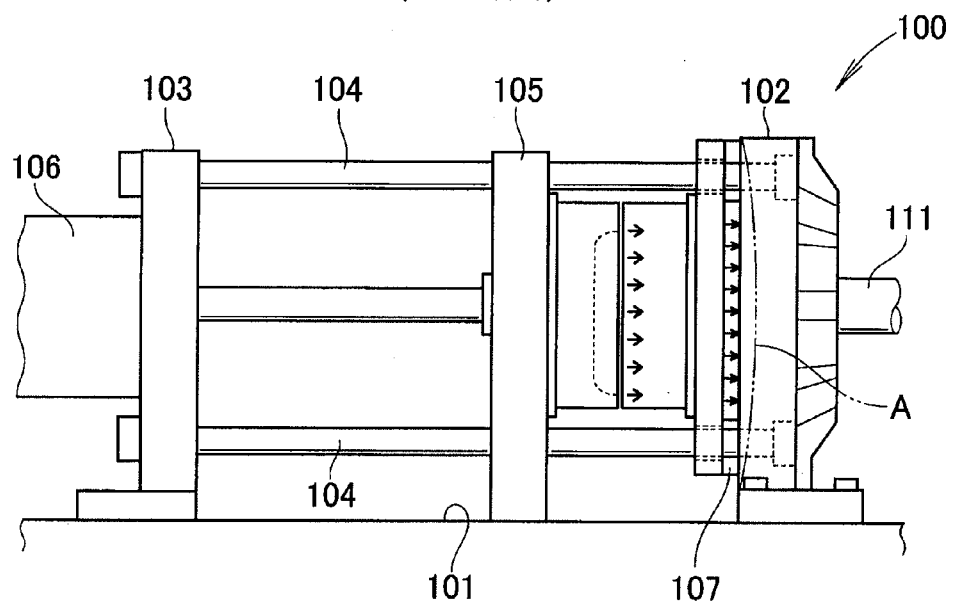
FIG. 10 is a view illustrating in front elevation a conventional mold clamping mechanism.
Figure 11:
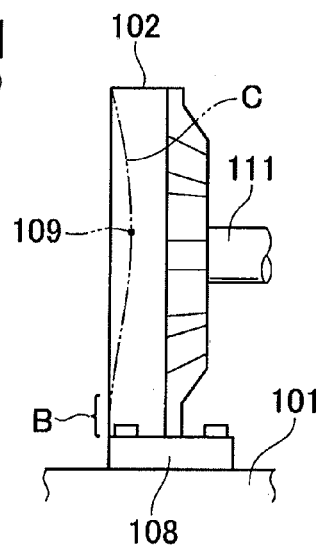
FIG. 11 is a view illustrating a problem in the mold clamping mechanism.

Reference is now made to FIG. 9, which is a cross-sectional view taken along line 9-9 of FIG. 7, illustrating the opposite-mold-side part 48 in vertical cross section. Connection parts 68L, 68R locally connecting the opposite-mold-side part 48 to main leg parts 51L, 51R. Namely, the opposite-mold-side part 48 is preferably connected to the left main leg part 51L via the left connection part 68L and to the right main leg part 51R via the right connection part 68R.

Next, the connection part 68L will be described.

The connection part 68L is represented by X-form diagonal lines. It is recommendable to provide the connection part 68L but it may be omitted, if desired. In case the connection part 68L is not provided, that portion of the opposite-mold-side part 48 which is proximate to the left lower through-hole 44 deforms easily in a Figure-sheet-front-back direction when an external force is applied in the Figure-sheet-front-back direction to the portion around the left lower through-hole 44. As a result, the same function (only the opposite-mold-side part 48 deforms) as discussed in relation to FIG. 5 is achieved easily.

In contrast, if the connection part 68L is provided, depending on the form of the connection part 86L, that portion of the opposite-mold-side part 48 which is proximate to the left lower through-hole 44 becomes hard to warp.

As a solution, provided between the lower side of the opposite-mold-side part 48 and the mail leg part 41L is a U-shaped groove 69L having a required depth and opening leftward. Distance L2 which is from the center of the left lower through-hole 44 to the bottom of the U-shaped groove 69L may be set to be larger than a distance L1 which is from the center of the left lower through-hole 44 to the left side of the opposite-mold-side part 48.

Distance L1 is desirably set to be 0.7-1.0 time the hole diameter d of the left lower through-hole 44, whilst the distance L2 may be set to be larger than the distance L1, namely, 0.9-1.2 times the hole diameter d of the left lower through-hole 44.

Owing to the presence of the distance L2, the part in the vicinity of the left lower through-hole 44 easily deforms in the Figure-sheet-front-back direction. The opposite-mold-side part 48 is connected to the mold-side part 47 (FIG. 7) via the connection part 49 extending toward the back side of the Figure sheet. Since the opposite-mold-side part 48 is additionally connected to the left and right main leg parts 51L, 51R through the left and right connection parts 68L, 68R, there is no concern over the opposite-mold-side part 48 being displaced downward.

Stated otherwise, provision of the left and right connection parts 68L, 68R enables omission of the sub-leg part 52 shown in FIG. 2.

Obviously, various minor changes and modifications of the present invention are possible in light of the above teaching. It is therefore to be understood that within the scope of the appended claims the invention may be practiced otherwise than as specifically described.

What is claimed is:

1. A mold clamping mechanism comprising:
   a bed;
   a fixed platen secured to the bed;
   a pressure receiving platen secured to the bed;
   upper and lower, left and right tie-bars extending between the fixed platen and the pressure receiving platen; and
   a movable platen mounted to the tie-bars, the movable platen and the fixed platen capable of being operated to effect clamping of a mold, wherein
   the fixed platen includes upper and lower, left and right through-holes through which extend respective ones of the tie-bars, and a cutout that extends transversely through the through-holes and divides the through-holes into mold-side holes and opposite-mold-side holes, the fixed platen is divided by the cutout into a mold-side part and an opposite-mold-side part, and the mold-side part is provided with main leg parts connected to the bed.

2. A mold clamping mechanism according to claim 1, wherein the mold-side hole has a diameter larger than that of the opposite-mold-side hole.

3. A mold clamping mechanism according to claim 1, wherein the opposite-mold-side part is provided with a sub-leg part connected to the bed, the sub-leg part being provided within the left and right through-holes.

4. A mold clamping mechanism according to claim 3, wherein the sub-leg part has an extension extending toward an injection machine beyond an opposite-mold-side surface of the opposite-mold-side part.

5. A mold clamping mechanism according to claim 1, further comprising a connection part connecting the mold-side part and the opposite-mold-side part, wherein the connection part comprises: a center part surrounding a sprue; an upward protrusion protruding upward from the center part; a leftward protrusion protruding leftward from the center part; a rightward protrusion protruding rightward from the center part; and a downward protrusion protruding downward from the center part.

6. A mold clamping mechanism according to claim 5, wherein the downward protrusion comprises at least two strap-shaped protruding parts spaced from each other in a left-and-right direction.

7. A mold clamping mechanism according to claim 5, wherein the upward protrusion is T-shaped and has an orthogonal part extending along an upper side of the mold-side part, the leftward protrusion is T-shaped and has an orthogonal part extending along a left side of the mold-side part, and the rightward protrusion is T-shaped and has an orthogonal part extending along a right side of the mold-side part.

8. A mold clamping mechanism according to claim 5, wherein the opposite-mold-side part is connected to left and right main leg parts through left and right connection parts.

9. A mold clamping mechanism according to claim 1, wherein the fixed platen has two opposed major surfaces bounded by a side surface, the through-holes extend through the fixed platen from one major surface to the other major surface, and the cutout comprises a groove that extends circumferentially around the side surface to a depth that passes through the through-holes.

10. A mold clamping mechanism according to claim 9, wherein the depth direction of the groove is transverse to the longitudinal direction of the through-holes.

* * * * *